United States Patent [19]

Ishitaka et al.

[11] Patent Number: 5,486,403

[45] Date of Patent: Jan. 23, 1996

[54] ALIGNMENT LAYER FOR LIQUID CRYSTAL ELEMENT AND METHOD OF PRODUCING SAME

[75] Inventors: Yoshihiko Ishitaka; Yumiko Sato; Munemitsu Abe, all of Sendai; Yorihiko Sasaki, Miyagi; Mitsuru Kano, Furukawa; Arao Sato, Sendai; Kiyomi Sugawara, Iwaki, all of Japan

[73] Assignee: Alps Electric Co., Ltd., Tokyo, Japan

[21] Appl. No.: 218,476

[22] Filed: Mar. 28, 1994

[30] Foreign Application Priority Data

Apr. 2, 1993 [JP] Japan ..................... 5-100500
Oct. 12, 1993 [JP] Japan ..................... 5-341435

[51] Int. Cl.⁶ ..................... B32B 9/00
[52] U.S. Cl. ..................... 428/167; 428/1; 428/141; 428/210
[58] Field of Search ..................... 428/1, 141, 167, 428/210

[56] References Cited

U.S. PATENT DOCUMENTS

| | | | |
|---|---|---|---|
| 4,127,322 | 11/1978 | Jacobson et al. | 353/31 |
| 4,232,947 | 11/1980 | Funada et al. | 350/341 |
| 4,252,414 | 2/1981 | Kinugawa et al. | 350/339 R |
| 4,256,377 | 3/1981 | Krueger et al. | 350/340 |
| 4,357,374 | 11/1982 | Ogawa | 428/1 |
| 4,370,194 | 1/1983 | Shaver et al. | 156/643 |
| 4,521,080 | 6/1985 | Funada et al. | 350/341 |
| 4,702,945 | 10/1987 | Etzbach et al. | 428/1 |
| 4,850,680 | 7/1989 | Yamazaki et al. | 350/340 |
| 4,892,392 | 1/1990 | Broer | 350/339 R |
| 4,948,708 | 8/1990 | Veenvliet et al. | 430/316 |
| 5,067,797 | 11/1991 | Yokokura et al. | 359/76 |
| 5,073,294 | 12/1991 | Shannon et al. | 252/299.01 |
| 5,155,610 | 10/1992 | Hikmet et al. | 359/75 |

FOREIGN PATENT DOCUMENTS

| | | |
|---|---|---|
| 52-148149 | 4/1976 | Japan . |
| 58-100121 | 12/1981 | Japan . |
| 57-192926 | 11/1982 | Japan . |
| 62-249124 | 4/1986 | Japan . |
| 63-136024 | 6/1988 | Japan . |
| 63-214721 | 9/1988 | Japan . |
| 2-283638 | 4/1989 | Japan . |
| 1-137237 | 5/1989 | Japan . |
| 1-145628 | 6/1989 | Japan . |
| 4-9007 | 1/1992 | Japan . |

*Primary Examiner*—Patrick J. Ryan
*Assistant Examiner*—Kam F. Lee
*Attorney, Agent, or Firm*—Guy W. Shoup; Patrick T. Bever

[57] ABSTRACT

An alignment layer for use in liquid crystals including a macromolecular material deposited on a glass substrate, the macromolecular material composed of main molecular chains which are, on the average, aligned in a first direction. A series of parallel microgrooves are formed in the macromolecular material and aligned perpendicular to the first direction, each microgroove being separated by a ridge having a triangular cross-section, and each ridge having first and second sides meeting at an apex, wherein the first side has a shorter length than the second side. As a result, disclination does not occur and sufficient reliability against external forces and heat may be obtained. In addition, numerous methods are disclosed for forming the alignment layer.

2 Claims, 9 Drawing Sheets

ALIGNMENT LAYER FOR LIQUID CRYSTAL ELEMENT AND METHOD OF PRODUCING SAME

BACKGROUND OF THE INVENTION

1. Field of the Invention

The present invention relates to an orientation layer for liquid crystal elements and methods of producing the same, which is provided to cause an alignment of liquid crystal molecules in a specified direction.

2. Description of the Related Art

Known orientation layers for liquid crystal element include: a layer obtained by subjecting a layer consisting of such insulating materials as a polyimide resin to a rubbing treatment where it is unidirectionally rubbed by means of a cloth or the like; and a layer formed by obliquely depositing silicon dioxide ($SiO_2$).

The orientation layer treated with a rubbing as described, however, has a problem that dust is caused and/or static electricity is generated when rubbing it by a cloth or the like in order to fabricate the orientation layer. On the other hand, the layer obtained by the oblique-deposition has, in addition to its too large fabrication costs, a problem that it is unable to respond to an increase in the size of the liquid crystal elements, since it is difficult to form the layer as one having a large area.

An orientation layer formed by a transfer method is known as the orientation layer capable of coping with such problems. The orientation layer by such transfer method is a layer on the surface of which ruggedness is formed by means of transfer by pressing a mold in a heated condition onto a resinous layer which has been formed on a substrate. The orientation layer based on such conventional transfer method has been formed as having a large number of projecting stripes repeated substantially in parallel to each other on the substrate.

Since, however, a pretilt angle is not obtained with the orientation layer formed by such conventional transfer method, there is a problem that unevenness occurs within the surface of a display screen whereby disclination tends to occur. This has been a decisive disadvantage for a crystal liquid element. In general, it is known that disclination hardly occurs for the pretilt angle of one degree or more.

Even though a very small amount of pretilt angle may be obtained, its distribution within the screen is uneven due to disorder in the convex condition so that unevenness occurs on the display screen. Further, a liquid crystal element using an orientation layer on which ruggedness is formed simply by means of the transfer method has a relatively weak boundary regulating force, whereby its reliability against an external force and/or heat is inferior.

SUMMARY OF THE INVENTION

It is an object of the present invention to solve the above problems by providing a high quality orientation layer for liquid crystals and methods for producing the same, which does not cause disclination while providing a sufficient reliability against external force and heat.

An orientation layer for liquid crystal element is provided in accordance with a first aspect of the present invention. The principal chain of molecules in a member constituting the orientation layer is, on the average, aligned in a specified direction. Substantially triangular ruggedness is repeatedly formed on the surface of the orientation layer in a manner repeating the ruggedness along said specified direction, such that two sides of the triangular shape forming a convex portion are different in length from each other.

In its second aspect, the present invention adds a feature to its first aspect such that, of two sides different in their length forming a convex portion of said substantially triangular shape repeating ruggedness along said specified direction, a longer side and another longer side or a shorter side and another shorter side are directly adjacent to each other.

In accordance with a third aspect of the present invention, methods of producing an orientation layer for liquid crystals are provided. It includes as a first processing step: the processing step in which a printing squeegee is moved along a specified direction of a substrate to form an orientation layer preparatory layer for forming an orientation layer on a substrate surface by means of screen printing; or the processing step in which a substrate is immersed into a member for constituting an orientation layer and then the substrate is pulled up from the member with a specified portion of the substrate side surfaces facing upward so as to form an orientation layer preparatory layer which is pulled up in a specified direction on the substrate surface; or the processing step in which an orientation layer preparatory layer uniaxially stretched substantially in a specified direction is formed by adhering it onto a substrate surface; or the processing step in which, after forming an orientation layer preparatory layer on a substrate surface, the orientation layer preparatory layer is rolled into a specified direction by rotating a pressing roller having a curved surface.

As a second processing step, the present invention in its third aspect furthermore includes: the processing step in which a mold having substantially triangular ruggedness formed repeatedly in a manner repeating the ruggedness in a specified direction of a surface thereof where two sides of the triangular shape forming a concave portion are different in length from each other, is pressed against the surface of the orientation layer preparatory layer formed on said substrate surface such that said specified direction substantially coincides with the direction as the specified direction used in the above first processing step, to transfer the surface configuration of the mold onto the surface of the orientation layer preparatory layer; or the processing step in which the orientation layer preparatory layer formed on said substrate surface is the orientation layer preparatory layer of a photosensitive type, where the orientation layer preparatory layer is subjected to a two-ray interference exposure such that a plurality of light rays capable of interfering with each other are incident thereon at different angles so as to produce interference fringes in a direction substantially perpendicular to the specified direction which has been used in the first processing step and then the orientation layer preparatory layer is developed; or the processing step in which the orientation layer preparatory layer formed on said substrate surface being the orientation layer preparatory layer of a photosensitive type, irradiating light onto the orientation layer preparatory layer through a mask having a gradient transmitting portion and a gradient light shielding portion along which amount of transmitting light gradually changes is repeated in the direction perpendicular to the specified direction which has been used in the first processing step and then developing the orientation layer preparatory layer.

In accordance with a fourth aspect of the present invention, there is provided a method of producing an orientation layer for liquid crystals, including the steps of: forming on a substrate surface an orientation layer preparatory layer consisting of high-molecular liquid crystals for constituting an orientation layer; pressing a mold on the surface of which substantially triangular ruggedness is repeated in manner repeating the ruggedness along a specified direction where two sides of the triangular shape forming a concave portion are different in length from each other, against the surface of the orientation layer preparatory layer in the state where the orientation layer preparatory layer is heated to a temperature 10° or more higher than the melting point of its material; cooling the orientation layer preparatory layer to a temperature 20° or more lower than said melting point in the state where the mold is pressed against it; and peeling said mold having been pressed against in the cooled state from the orientation layer preparatory layer.

The above described technical means produce the effects as follows.

In the first aspect of the present invention, the principal chain of molecules in the orientation layer preparatory layer for constituting the orientation layer, on the average, is aligned in a specified direction. Of the liquid crystal element using such orientation layer, the liquid crystal molecules are therefore aligned in accordance with the principal chain of the orientation layer preparatory layer so that the liquid crystal molecules are aligned in the above specified direction.

Further, ruggedness of substantially a triangular shape is formed repeatedly on the surface of the orientation layer preparatory layer in such a manner as to repeat the ruggedness along the specified direction. Such a triangular shape has two sides forming a convex portion that are different in length from each other. The liquid crystal molecules are thus provided with a sufficient pretilt angle and variance in the pretilt angle within the substrate surface hardly occurs so that disclination is difficult to occur.

Moreover, in the second aspect of the present invention, it is possible to align liquid crystal molecules in a regulated manner and in different directions within a liquid crystal cell.

In the third aspect of the present invention, it is possible by means of the first processing step to form a layer in which the principal chain of molecules in the orientation layer preparatory layer for constituting the orientation layer, on the average, is aligned in a specified direction. For this reason, the liquid crystal molecules in a liquid crystal element using the present orientation layer are aligned in accordance with the principal chain of the orientation layer preparatory layer so that the liquid crystal molecules may securely be aligned in a specified direction.

Furthermore, by means of the second processing step, ruggedness of substantially a triangular shape is repeated with a good reproducibility on the surface of the orientation layer preparatory layer in a manner repeating the ruggedness along the specified direction. Such a triangular shape has two sides for forming a convex portion that are different in length from each other. Of the liquid crystal element using the orientation layer obtained by the present invention, the liquid crystal molecules are thus provided with a sufficient pretilt angle and variance in the pretilt angle within the substrate surface hardly occurs so that disclination is difficult to occur.

In the fourth aspect of the present invention, an orientation layer preparatory layer consisting of high-molecular liquid crystals is formed on a substrate surface through a process in which high-molecular liquid crystal for constituting an orientation layer is formed on the substrate surface. Since this high-molecular liquid crystal layer is heated to a temperature 10° or more higher than the melting point of its material, the orientation layer preparatory layer is brought into its state capable of being fluidized. In this state, by means of a treatment in which a mold having a desired configuration on the surface thereof is pressed against the surface of the orientation layer preparatory layer, the principal chain of molecules within the orientation layer preparatory layer is aligned in accordance with the configuration on the surface of the pressed mold.

Further, by means of the process in which the orientation layer preparatory layer is cooled in its state pressed against the mold to a temperature 20° or more lower than said melting temperature, the surface of the orientation layer preparatory layer is cured while holding the surface configuration of the pressed mold.

In this state, by peeling the mold which has been pressed against in the cooled state from the orientation layer preparatory layer, it is possible to securely fabricate an orientation layer for liquid crystals where the principal chain of molecules of the high-molecular liquid crystal is aligned in a specified direction.

In the manner as described, the orientation layer for liquid crystals according to the first aspect of the present invention may be securely fabricated based on the producing methods according to the third and fourth aspects of the present invention.

DESCRIPTION OF THE PREFERRED EMBODIMENTS

Figure 1A:
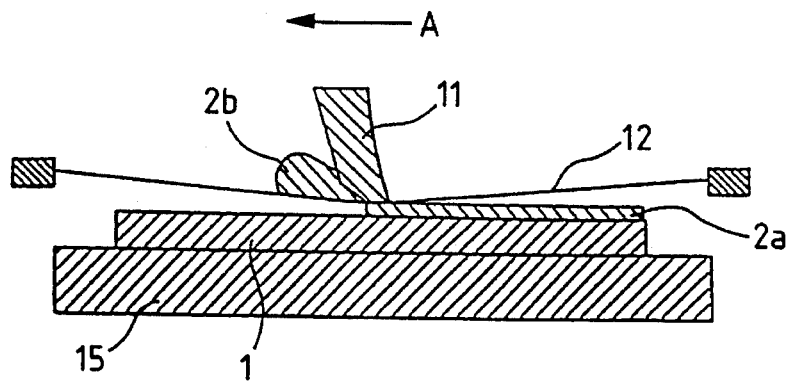
FIGS. 1A, 1B, 1C and 1D are schematic sectional views for explaining an example of the present invention.

While the present invention will be described below in more detail by way of some examples, the present invention is not limited by such examples.

Example 1

A schematic cross sectional view for explaining the process of the present example is shown in FIG. 1. As shown in FIG. 1A, a rectangular glass substrate 1 having transparent electrodes (not shown) formed on the surface thereof is placed on a stage 15. A material 2b obtained as solving 5% by weight of PES (polyether sulfone, produced by Mitsui Toatsu Chemicals Inc.) into γ-butyl lactone is printed by means of screen printing on the surface of the glass substrate 1 in the thickness of 0.1 μm so as to form an orientation layer preparatory layer 2a.

At this time, the material 2b is printed by moving a printing squeegee 11 by way of a screen 12 at about 20 cm/sec along the direction of A as shown in the figure which is the direction of the length of the glass substrate 1.

This substrate is pre-baked for 30 sec at 80° C. It is furthermore subjected to baking for one hour at 180° C. Here, it is also possible to render screen printing of the material 2b onto the surface of the glass substrate 1 in a state where the glass substrate 1 is previously preheated to 80° C., and to subject it to the baking.

Of the glass substrate 1 on the surface of which the orientation layer preparatory layer 2a has been formed in this manner, refractive index nA with respect to polarized light lengthwise thereof differs from refractive index nB with respect to polarized light perpendicular thereto in the direction of the width of the glass substrate. The refractive index nA is the maximum within the surface while the refractive index nB perpendicular thereto is the minimum within the surface, their difference $\Delta n$ being $1.53 \times 10^{-3}$.

Such anisotropy of refractive index indicates the fact that the principal chain of the molecules forming the orientation layer preparatory layer 2a which has been formed on the surface of the glass substrate 1 is aligned along the direction of the length of the glass substrate 1.

Figure 1B:
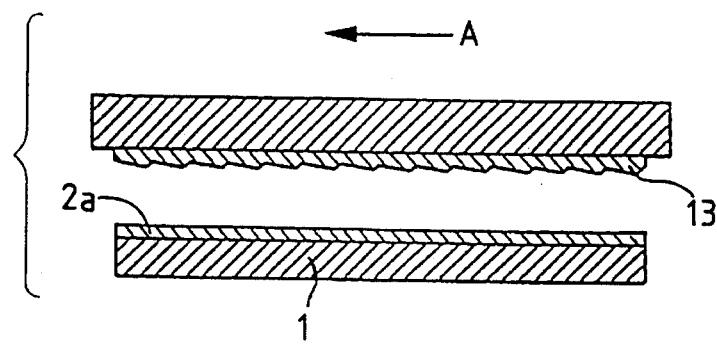

Next, as the second half of the process, a mold 13 made of an epoxy resin having substantially triangular ruggedness repeated on the surface thereof, each triangular shape of which two sides forming a concave portion being different in their length from each other, is placed as shown in FIG. 1B in a manner facing the glass substrate 1 with the orientation layer preparatory layer being formed on the surface thereof. At this time, it is placed in the facing manner so that substantially the triangular shape on the mold surface is repeated along the direction A of FIG. 1A.

Figure 1C:
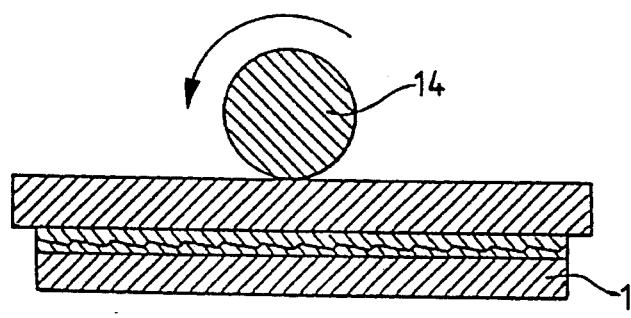

Next, the orientation layer preparatory layer 2a is kept for five minutes in the state where it is heated to 240° C. and, then, at this temperature, the mold 13 is pressed against the surface of the orientation layer preparatory layer 2a while rolling a mold pressing roller 14 as shown in FIG. 1C. At this time, pressing force of the mold pressing roller 14 against the mold 13 was 50 kg/cm², and the traveling rate of the mold pressing roller 14 was set to 15 mm/sec.

After pressing the entire surface of the glass substrate 1 by the mold pressing roller 14, the substrate temperature was lowered to 200° C. and the mold 13 was peeled from the glass substrate 1.

Figure 1D:
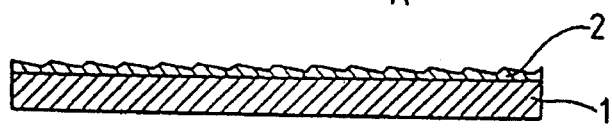
Figure 10:
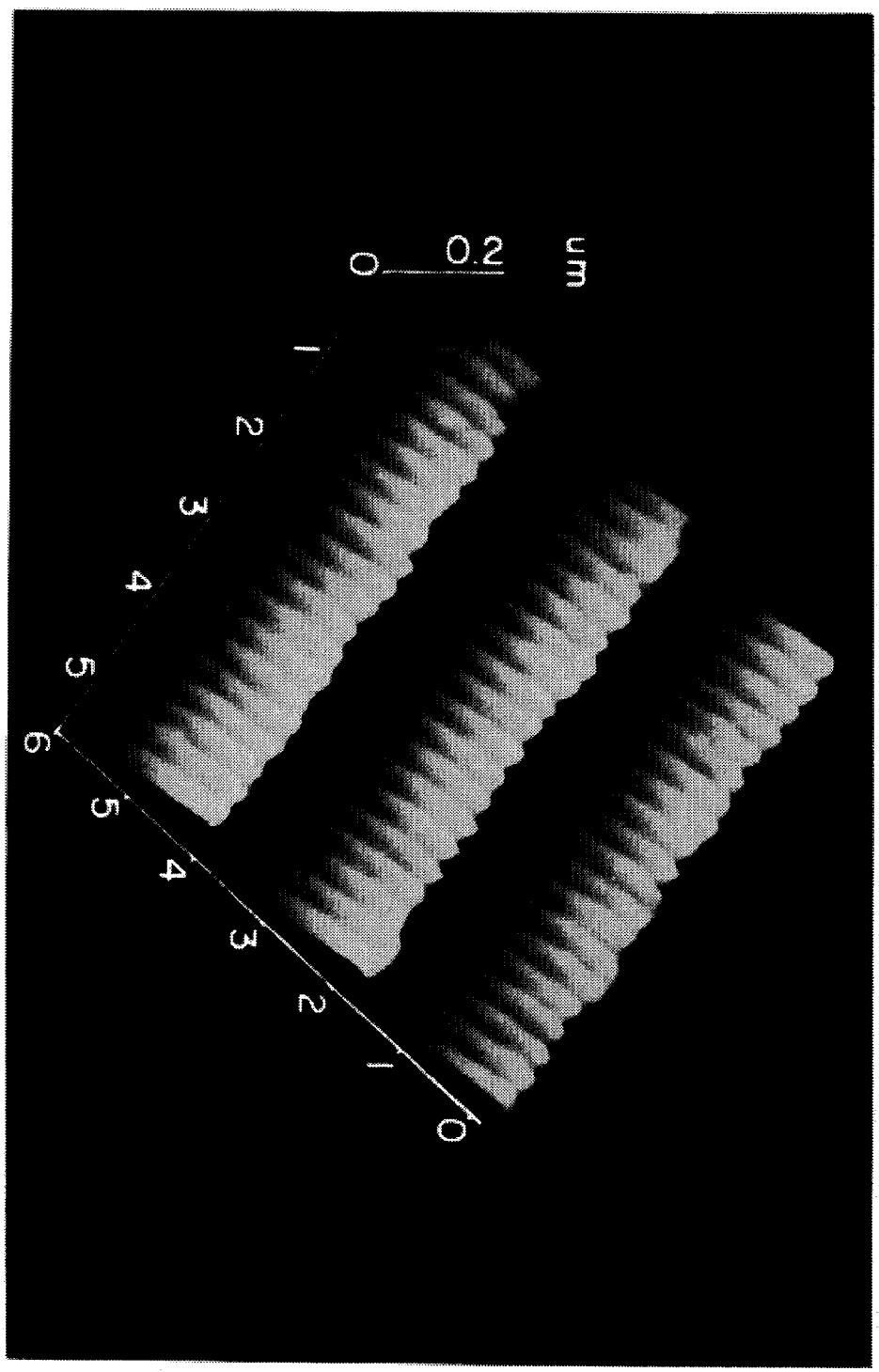
FIG. 10 is a schematic perspective view for explaining an example of the present invention.

As a result of the above process, substantially triangular ruggedness is formed as shown in FIG. 1D on the surface of the orientation layer 2 in a repeated manner along the traveling direction of the printing squeegee 11, i.e., lengthwise of the glass substrate 1 so as to repeat ruggedness in such direction. The surface configuration has been transferred of the mold 13 having the configuration of which the above triangular shape has two sides forming a concave portion that are different in length from each other. A perspective view of such surface configuration is shown in FIG. 10. As shown in FIG. 10, a plurality of continuous convex ridges are formed such that ones next to each other are separated from one another by a continuous groove and each ridge is formed by a convex portion of substantially a triangular shape which is not symmetrical with respect to the axis of the ridge. Such convex portion of substantially a triangular shape has a length along the direction of the ridge that is longer than its length along the width of the ridge. Further, none of the surfaces forming the plurality of ridges and grooves scarcely has a portion parallel to the substrate.

In other words, the glass substrate 1 was obtained, in which the principal chain of molecules in the member constituting the orientation layer 2 formed on the surface thereof is aligned along the length of the glass substrate 1 and, on the surface of the orientation layer 2, a substantially triangular convex shape which has left and right sides that are not symmetrical to each other is repeated in a large number along the length of the glass substrate 1.

In the present example, while PES (polyether sulfone, produced by Mitsui Toatsu Chemicals Inc.) has been used as the orientation layer material, other materials may also be used. Preferably, glass transition temperature of the orientation layer material is higher than 130° C. from the viewpoint of thermal stability of the liquid crystal element and is lower than 280° C. from the viewpoint of the fact that the process of transferring the surface configuration is to be performed. When an orientation layer material satisfying these conditions is used, it is possible to achieve an orientation layer for liquid crystals having an excellent heat-resisting property and capable of transferring a mold configuration by an easy process.

Also, from the viewpoint of adhesion to the substrate, supposing $\gamma p^{AL}$ as the polar component of the surface energy of the orientation layer material and $\gamma p^g$ as the polar component of the surface energy of the substrate material:

$$|\gamma p^{AL} - \gamma p^g| < 1 \mathrm{erg/cm^2}$$

is preferably satisfied. Further, from the viewpoint of peelability from the transfer mold, supposing $\gamma p^r$ as the polar component of the surface energy of the mold material:

$$|\gamma p^{AL} - \gamma p^r| > 2 \mathrm{erg/cm^2}$$

is preferably satisfied. By using an orientation layer material satisfying these conditions, it is possible to achieve an orientation layer for liquid crystals which is excellent in adhesion to the substrate and is easily removed from the mold. Those satisfying these conditions include, for example, SEMICOFINE (polyimide resin produced by Toray Industries Inc.).

Polarizing sheets are combined with two glass substrates fabricated as described to make a liquid crystal element of TN (twisted nematic) type. At this time, the orientation layers were combined so that they face each other and the longitudinal directions of the respective glass substrates are perpendicular to each other, and they are disposed to have a separation of 5 μm between them.

The TN type liquid crystal element fabricated as described was completely free of unevenness within the display screen both in its initial orientation and in the state where an AC of 2 V was applied across it and disclination did not occur. It is seen from this that uniform and sufficient pretilt angle is provided in the liquid crystal element which uses an orientation layer fabricated according to the present method.

Further, in order to find out the degree of the orientation of the liquid crystal molecules, 1% by weight of a dichroic dye (LSB-278 produced by Mitsubishi Kasei) was added to the nematic liquid crystal and a dichromic ratio was measured, which was the ratio of transmittance with respect to polarized light of the lengthwise direction and of the widthwise direction of one of the substrates. A dichromic ratio of 10 was obtained and the fact that the liquid crystal molecules were sufficiently aligned was recognized. Furthermore, the displaying performance of the TN type liquid crystal element fabricated as described was not affected at all in a test where a cycle of thermal load of holding it respectively at −40° C. and at 80° C. for one hour was repeated twenty times. Likewise, it was not affected by a vibration test according to JIS-C 5025A.

It is presumed that such stability against heat and external forces indicates the fact that the liquid crystal molecules are aligned in accordance with the principal chain where the molecules of the member constituting the orientation layer are most stable.

In the present example, a glass substrate of a rectangular shape was used as the substrate. Naturally, the shape of the substrate which may be used in the present invention is not limited to this and the material thereof, too, may be one of various other materials such as ceramics.

Further, although it is necessary that the traveling direction of the printing squeegee 11 and the direction along which the substantially triangular shapes are arranged are substantially the same direction, such direction is not necessarily limited to the longitudinal direction of the substrate and it may be the widthwise direction or be an oblique direction thereof.

Example 2

Figure 4A:
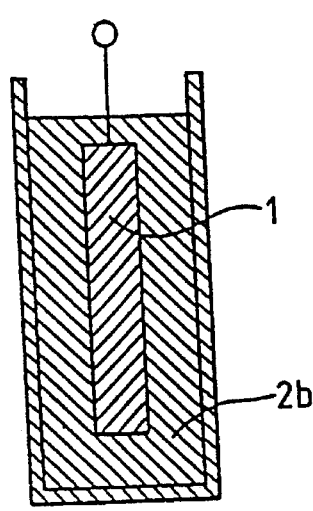
FIGS. 4A and 4B are schematic sectional views for explaining an example of the present invention.
Figure 4B:
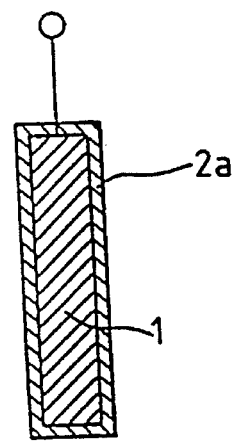

A schematic cross sectional view for explaining the process of the present example is shown in FIG. 4.

A glass substrate 1 having transparent electrodes (not shown) formed on the surface thereof is immersed into a material 2b of a 1,1,1,3,3,3-hexaphloro-2-propanol solution containing 5% of high-molecular liquid crystal (produced by Asahi Denka Kogyo K.K.). The glass substrate 1 was then pulled up at a rate of 2.5 cm/min from the material 2b with a shorter side of the glass substrate 1 pointing upward. An orientation layer preparatory layer 2a is applied on the surface of the substrate 1.

This substrate 1 was pre-baked for 30 sec at 80° C. and was then subjected to baking at 120° C. for one hour.

Of the glass substrate 1 on the surface of which the orientation layer preparatory layer 2a has been formed as described, refractive index nD with respect to a polarized light in the direction of its length which was the pulling-up direction differed from refractive index nE with respect to a polarized light perpendicular thereto in the direction of the width of the glass substrate 1. The refractive index nD was the maximum within the surface while the refractive index nE perpendicular thereto was the minimum within the surface, their difference Δn being $2.31 \times 10^{-3}$.

Such anisotropy of refractive index indicates the fact that the principal chain of the high-molecular liquid crystal molecules forming the orientation layer preparatory layer 2a which has been formed on the surface of the glass substrate 1 is aligned along the direction of the length of the glass substrate 1.

Next, the glass substrate 1 is subjected to the process of FIG. 1B and after as described in the above Example 1. It should be noted that, when a mold 13 made of epoxy resin having substantially triangular recess of which left and right are not symmetrical to each other is to be brought to face the glass substrate 1 having the orientation layer preparatory layer 2b formed on the surface thereof, it is placed in manner facing thereto such that the substantially triangular configuration on the mold surface is repeated along the pulling-up direction of the glass plate 1.

Further, 5-minute heating prior to pressing by a mold pressing roller 14 was set to 210° C. and peeling of the mold 13 was effected after lowering the substrate temperature to 180° C.

As a result of the above process, substantially triangular ruggedness is formed as shown in FIG. 1D on the surface of the orientation layer 2 in a repeated manner along the direction in which the principal chain of the high-molecular liquid crystal molecules forming the orientation layer is aligned, i.e., along the length of the glass substrate 1 so as to repeat ruggedness. The surface configuration has been transferred of the mold 13 having the configuration of which the above triangular shape has two sides forming a convex portion that are different in length from each other.

In other words, the glass substrate 1 was obtained, in which the principal chain of the high-molecular liquid crystal molecules forming the orientation layer 2 formed on the surface thereof is aligned along the length of the glass substrate 1 and, on the surface of the orientation layer 2, convex shape of substantially a triangular shape which has left and right sides that are not symmetrical to each other is repeated in a large number along the length of the glass substrate 1.

By using the glass substrates obtained in this manner, a TN-type liquid crystal element was made in a similar manner as Example 1.

The TN type liquid crystal element fabricated as described was completely free of unevenness within the display screen both in its initial orientation and in the state where an AC of 2 V was applied across it and disclination did not occur. It is seen from this that uniform and sufficient pretilt angle is provided in the liquid crystal element which uses an orientation layer fabricated according to the present method.

Further, a value of 9.5 was obtained as a dichromic ratio for indicating the degree of orientation of the liquid crystal molecules. Sufficient orientation of the liquid crystal molecules was recognized.

According to the present example, a reliability similar to that of the above Example 1 was obtained. The pulling-up direction of the substrate and the direction along which the substantially triangular protrusions not symmetrical at its left and right are aligned are not limited to the direction of the length of the glass substrate. Naturally these may coincide with the direction of the width or an oblique direction thereof.

Example 3

Figure 2:
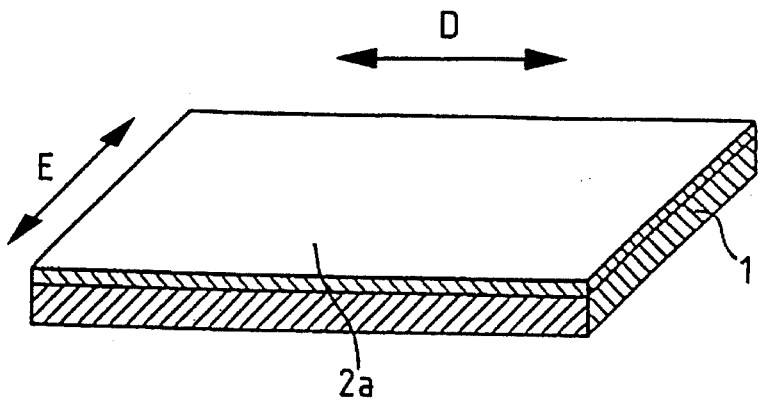
FIG. 2 is a schematic perspective view for explaining an example of the present invention.

A schematic perspective view for explaining the process of the present example is shown in FIG. 2.

A PVA (polyvinyl alcohol) film (produced by The Nippon Synthetic Chemical Industry Co.,Ltd.) having a thickness of 20μm formed by means of rolling is adhered to the surface of a rectangular glass substrate 1 having transparent electrodes (not shown) on the surface thereof, to fabricate the glass substrate 1 on the surface of which an orientation layer preparatory layer 2a is formed.

Of the glass substrate 1 on the surface of which the orientation layer preparatory layer 2a has been formed as described, refractive index nD with respect to a polarized light in the direction of D as shown in FIG. 2 which is its length direction differed from refractive index nE with respect to a polarized light perpendicular thereto in the direction of E as shown in FIG. 2 which is widthwise of the glass substrate 1. The refractive index nD was the maximum within the surface while the refractive index nE perpendicular thereto was the minimum within the surface, their difference Δn being $5.83\times10^{-3}$.

Such anisotropy of refractive index indicates the fact that the principal chain of PVA molecules forming the orientation layer preparatory layer 2a formed on the surface of the glass substrate 1 is aligned along the direction of the length of the glass substrate 1. This is presumably because the used PVA film was formed by means of rolling so that the principal chain of PVA molecules was aligned at during its manufacturing process.

Next, the glass substrate 1 is subjected to the process of FIG. 1B and after as described in the above Example 1. It should be noted that, when a mold 13 made of epoxy resin having substantially triangular recess of which left and right sides are not symmetrical to each other is to be brought to face the glass substrate 1 having the orientation layer preparatory layer 2b formed on the surface thereof, it is placed in manner facing thereto such that the substantially triangular configuration on the mold surface is repeated along the direction of D as shown in FIG. 2.

Further, 5-minute heating prior to pressing by a mold pressing roller 14 was set to 150° C. and peeling of the mold 13 was effected after lowering the substrate temperature to 60° C.

As a result of the above process, as shown in FIG. 1D, the surface configuration of the mold 13 was transferred onto the surface of the orientation layer 2, where ruggedness of substantially a triangular configuration of which two sides are different in length from each other is repeated in a manner having its sloped sides along the direction in which the principal chain of the PVA molecules forming the orientation layer is aligned, i.e., along the length of the glass substrate 1.

In other words, the glass substrate 1 was obtained, in which the principal chain of the PVA molecules forming the orientation layer 2 formed on the surface thereof is aligned along the length of the glass substrate 1 and, on the surface of the orientation layer 2, convex shape of substantially a triangular shape which has left and right sides that are not symmetrical to each other is repeated in a large number along the length of the glass substrate 1.

By using the glass substrates 1 obtained in this manner, a TN-type liquid crystal element was made in a similar manner as Example 1.

The TN type liquid crystal element fabricated as described was completely free of unevenness within the display screen both in its initial orientation and in the state where an AC of 2 V was applied across it and disclination did not occur. It is seen from this that uniform and sufficient pretilt angle is provided in the liquid crystal element which was fabricated according to the present method.

Further, reliability characteristic equivalent to that obtained in the above Example 1 was obtained from the TN type liquid crystal element fabricated in this manner.

It is presumed that such stability against heat and external forces indicates the fact that the liquid crystal molecules are aligned in a similar manner as the above Example 1 in accordance with the principal chain where the molecules of the member constituting the orientation layer are most stable.

Example 4

A schematic cross sectional view for explaining the process of the present example is shown in FIG. 3.

Figure 3A:
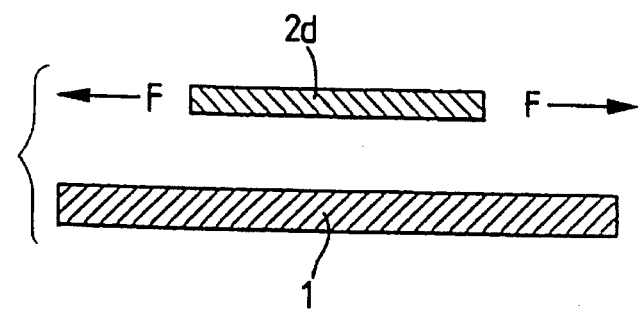
FIGS. 3A, 3B and 3C are schematic sectional views for explaining an example of the present invention.
Figure 3B:
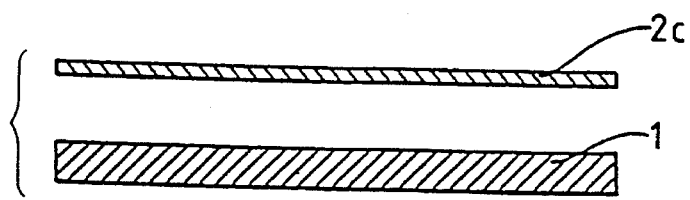
Figure 3C:
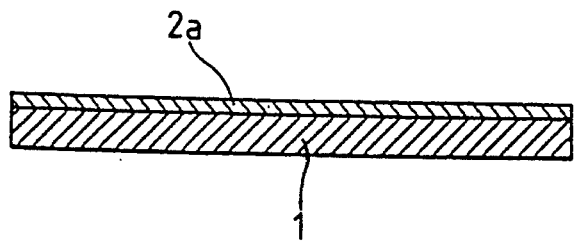

The present example differs from the above Example 3 in that used as the PVA film to be adhered to the surface of the rectangular glass substrate 1 having transparent electrodes (not shown) formed on the surface thereof is a PVA film obtained by previously stretching a member 2d of PVA uniaxially in the direction of F as shown in FIG. 3A.

An orientation layer preparatory layer 2c of such uniaxially stretched PVA film was placed in a manner facing the glass substrate 1 so that the direction of stretching coincides with the lengthwise direction of the glass substrate 1 (FIG. 3B) and was adhered to the surface of the glass substrate 1.

Of the glass substrate 1 on the surface of which the orientation layer preparatory layer 2a has been formed as described (FIG. 3C), refractive index nD with respect to a polarized light in the lengthwise direction (direction of the uniaxial stretching) differed from refractive index nE with respect to a polarized light perpendicular thereto in the widthwise direction of the glass substrate 1. The refractive index nD was the maximum within the surface while the refractive index nD perpendicular thereto was the minimum within the surface, their difference Δn being varied in the range of $1.24\times10^{-3}\sim11.00\times10^{-3}$ according to the extent of stretching.

Such anisotropy of the refractive index indicates the fact that the principal chain of PVA molecules forming the orientation layer preparatory layer 2a formed on the surface of the glass substrate 1 is aligned in a similar manner as the above Example 3 along the direction of the length of the glass substrate 1.

Next, the glass substrate 1 is subjected to the process of FIG. 1B and after as described in the above Example 1. It should be noted that, when a mold 13 made of epoxy resin having substantially triangular recess of which left and right sides are not symmetrical to each other is to be brought to face the glass substrate 1 having the Orientation layer preparatory layer 2b formed on the surface thereof, it is placed in manner facing thereto such that the substantially triangular configuration on the mold surface is repeated in a large number along the direction of the uniaxial stretching.

By using the glass substrates obtained in this manner, a TN type liquid crystal element was made in a similar manner as Example 1.

The TN type liquid crystal element fabricated as described was completely free of unevenness within the display screen both in its initial orientation and in the state where an AC of 2 V was applied across it and disclination did not occur. It is seen from this that uniform and sufficient pretilt angle is provided in the liquid crystal element which was fabricated according to the present method.

Also, dichromic ratio of the liquid crystal for indicating the degree of orientation of the liquid crystal molecules was increased from 3 to 10 in accordance with the increase in extent of the stretching, whereby it was recognized that as the extent of the stretching was increased, the degree of the orientation of the liquid crystal element was also augmented.

Further, reliability characteristic equivalent to that obtained in the above Example 1 was obtained from the TN type liquid crystal element fabricated in this manner, and it was stable with respect to heat and external forces.

It is presumed that such stability against heat and external forces indicates the fact that the liquid crystal molecules are aligned in accordance with the principal chain where the molecules of the member constituting the orientation layer are most stable.

In the present example, too, the direction of the uniaxial stretching and the direction along which the substantially triangular configurations with not symmetrical left and right sides are to be aligned are not limited to the lengthwise direction of the glass substrate and may naturally be the widthwise direction or an oblique direct ion thereof.

Example 5

The present example differs from the above Example 1 in the material of the orientation layer and in the method of forming the rugged configuration.

A photosensitive member was used as the material of the orientation layer.

First, a light absorption layer (produced by Brewer Science Co., Ltd.) was applied by means of spin coating onto the surface of the glass substrate 1 having transparent electrodes (not shown) formed on the surface thereof for the purpose of prevention of reflection at the time of exposure to a light and it was then subjected to baking at 130° C. for 30 minutes. Thereafter, as a member 2b for the orientation layer material, S1400-31 (photosensitive material produced by Supray Ltd.) was used to form the orientation layer preparatory layer 2a by printing it by means of screen printing in a similar manner as Example 1 into a layer thickness of 0.1 μm. This substrate was subjected to prebaking at 90° C. for 30 minutes.

Figure 5:
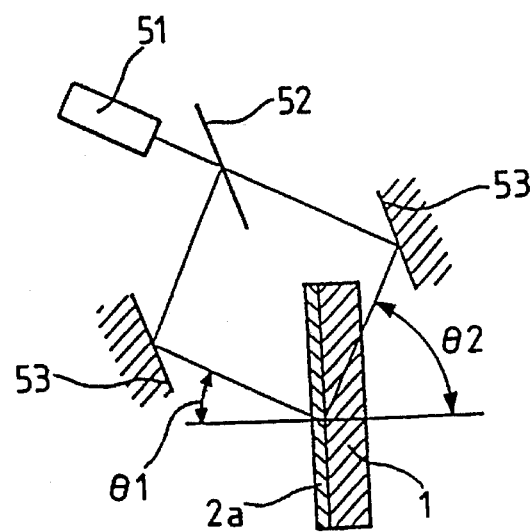
FIG. 5 is a schematic sectional view for explaining an example of the present invention.

Next, as shown in FIG. 5, light was emitted from a laser source 51 of an argon ion laser. Light rays obtained by separating the light having the wavelength of 457.9 nm through a translucent mirror 52 are reflected by total reflection mirrors 53, respectively, so as to irradiate it onto obverse surface and reverse surface of the photosensitive material by means of screen printing as described which is an orientation layer preparatory layer 2a.

At this time, angle of incidence θ1, θ2 of the rays to be irradiated on the substrate were 41°, 65°, respectively. Further, setting was made so that interference fringe obtained by such incident rays were generated in the direction perpendicular to the traveling direction of the printing squeegee 4.

By developing the orientation layer material subjected to such two-ray interference exposure in this manner, substantially triangular convex of which left and right sides are not symmetrical to each other is repeated in a large number on the surface of the photosensitive material, substantially along the traveling direction of the printing squeegee 4.

By using the glass substrates obtained in this manner, a TN type liquid crystal element was made in a similar manner as Example 1.

The TN type liquid crystal element fabricated as described was completely free of unevenness within the display screen both in its initial orientation and in the state where an AC of 2 V was applied across it and disclination did not occur.

It is seen from this that uniform and sufficient pretilt angle is provided in the liquid crystal element which was fabricated according to the present method.

Example 6

Figure 6A:
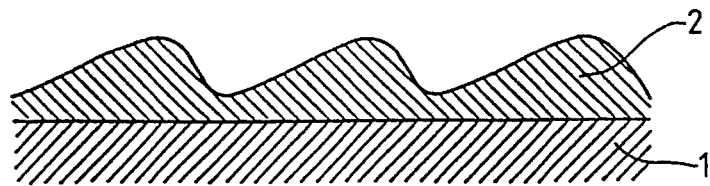
FIGS. 6A, 6B and 6C are schematic sectional views for explaining an example of the present invention.
Figure 6B:
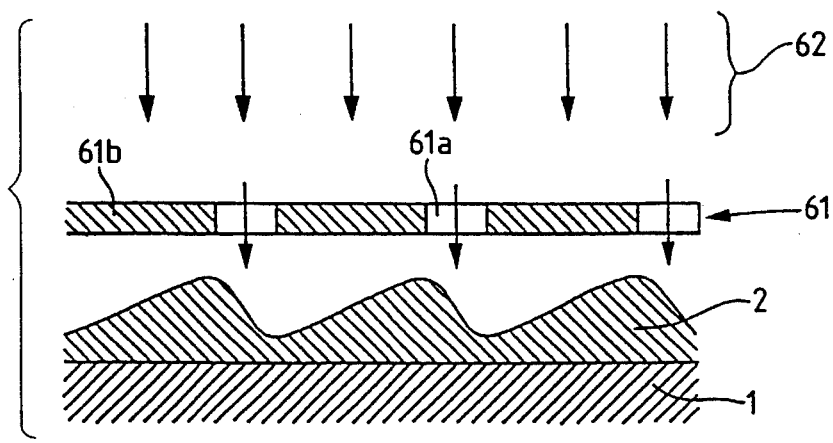
Figure 6C:
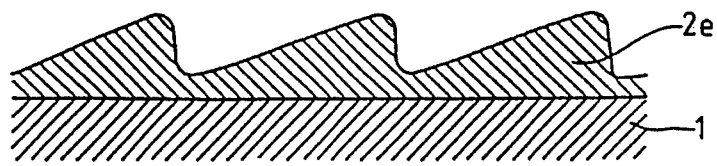

In the present example, a photolithographic process as shown in FIG. 6 is furthermore applied onto the surface of the glass substrate 1 on which the orientation layer obtained in the above Example 5 is formed.

On the surface of the glass substrate obtained in Example 5, the orientation layer 2 is formed as shown in FIG. 6A such that substantially triangular configuration of which left and right sides are not symmetrical to each other is repeated in a large number.

Parallel rays of light are irradiated on such surface through a mask 61 as shown in FIG. 6B so as to provide an additional exposure to the portions of the steeper oblique sides to form oblique sides that are even more steeper.

By using the glass substrates obtained in this manner, a TN type liquid crystal element was made in a similar manner as Example 1.

The TN type liquid crystal element fabricated in this manner exhibited even more favorable characteristic comparing to the liquid crystal element which used the orientation layer obtained in Example 5.

Example 7

In the present example, the pulling-up method which is the first half of the process in Example 2 and the two-ray interference exposure method which the second half process in the above Example 5.

The first half process of the present example is described below by way of FIG. 4.

The first half process of the present example is different from the first half process of the above Example 2 in the material to be used. In the present example, a glass substrate 1 on the surface of which a reflection preventing layer (not shown) described in the above example 5 and transparent electrodes (not shown) are formed is immersed into a material 2b consisting of a solution containing 33% of S1400-31 (photosensitive material produced by Supray Ltd.). The above glass substrate 1 was pulled up at a rate of 2.5 cm/min from the material 2b where a shorter side of the glass substrate 1 is set as the upper side thereof, to apply an orientation layer preparatory layer 2a on the glass substrate 1.

This glass substrate 1 was prebaked at 90° C. for 30 minutes.

The glass substrate 1 having the orientation layer preparatory layer 2a formed on the surface thereof was subjected to the two-ray interference exposure as described in the above Example 5.

Here, setting was made so that interference fringes obtained by such incident rays were generated in the direction perpendicular to the pulling-up direction of the substrate.

By developing the orientation layer material subjected to such two-ray interference exposure in this manner, substantially triangular convex of which left and right sides are not symmetrical to each other is repeated in a large number on the surface of the photosensitive material, substantially along the pulling-up direction of the glass substrate 1.

By using the glass substrates obtained in this manner, a TN type liquid crystal element was made in a similar manner as Example 1.

The TN type liquid crystal element fabricated as described was completely free of unevenness within the display screen both in its initial orientation and in the state where an AC of 2 V was applied across it and disclination did not occur.

It is seen from this that uniform and sufficient pretilt angle is provided in the liquid crystal element which was fabricated according to the present method.

Example 8

In the present example, the uniaxial stretching method which is the first half of the process in the above Example 4 and the two-ray interference exposure method which is the second half of the process of the above Example 5 are combined.

The first half process of the present example will be described below by way of FIG. 3.

The first half process of the present example differs from the first half process of the above Example 4 in the material to be used.

An orientation layer preparatory layer 2c consisting of a photosensitive film which was uniaxially stretched in the direction of F as shown in FIG. 3A was positioned to face the surface of a rectangular glass substrate 1 on the surface of which transparent electrodes (not shown) and reflection preventing layer (not shown) were formed such that the direction of stretching coincides with the lengthwise direction of the glass substrate 1 (FIG. 3B), and it was adhered thereto.

Of the glass substrate 1 on the surface of which the orientation layer preparatory layer 2a has been formed as described (FIG. 3C), refractive index nD with respect to a polarized light in the lengthwise direction (direction of the uniaxial stretching) differed from refractive index nE with respect to a polarized light perpendicular thereto in the widthwise direction of the glass substrate 1. The refractive index nD was the maximum within the surface while the refractive index nE perpendicular thereto was the minimum within the surface. Such anisotropy of the refractive index indicates the fact that the principal chain of molecules forming the orientation layer preparatory layer 2a formed on the surface of the glass substrate 1 is aligned in a similar manner as the above Example 4 along the direction of the length of the glass substrate 1.

The glass substrate 1 fabricated as described was subjected to the two-ray interference exposure as described in the above Example 5.

By developing the orientation layer material subjected to such two-ray interference exposure in this manner, substantially triangular convex of which left and right sides are not symmetrical to each other is repeated in a large number on the surface of the photosensitive material, substantially along the direction of the uniaxial stretching.

By using the glass substrates obtained in this manner, a TN type liquid crystal element was made in a similar manner as Example 1.

The TN type liquid crystal element fabricated as described was completely free of unevenness within the display screen both in its initial orientation and in the state where an AC of 2 V was applied across it and disclination did not occur.

It is seen from this that uniform and sufficient pretilt angle is provided in the liquid crystal element which uses the orientation layer fabricated according to the present method.

Example 9

The present example is described below by way of FIG. 8.

Figure 8A:
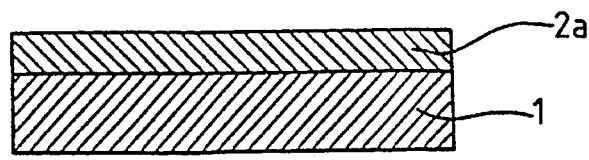
FIGS. 8A, 8B, 8C and 8D are schematic sectional views for explaining an example of the present Invention.

A solution of 1,1,1,3,3,3-hexaphloro-2-propanol solution containing 5% of high-molecular liquid crystal (produced by Asahi Denka Kogyo) was applied on the surface of a triangular glass substrate 1 to form an orientation preparatory layer 2a. It was prebaked for 30 sec at 80° C. and was subjected to baking at 120° C. for one hour (FIG. 8A).

Figure 8B:
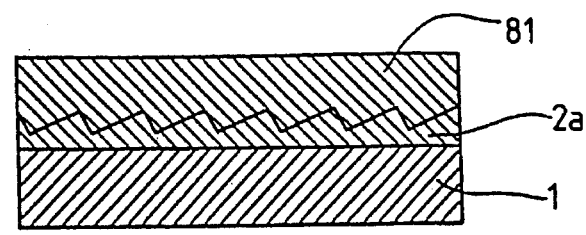

In the state where the orientation layer preparatory layer 2a was heated to 210° C. which is the temperature 10 degrees or more higher than 200° C. that is the melting point of the material, a mold 81 on the surface of which ruggedness of substantially a triangular shape is repeated in a manner repeating the ruggedness in a specified direction where two sides forming a concave portion of the triangular shape are different in length from each other was pressed against the surface of the orientation layer preparatory layer 2a (FIG. 8B).

Figure 8C:
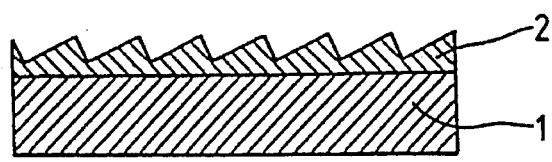

In the state where the mold 81 was being pressed against it, the orientation layer preparatory layer 2a was cooled to 180° C. which is the temperature 20 degrees or more lower than the above melting point. In such cooled state, he pressed mold 81 was peeled from the orientation layer preparatory layer 2a to form an orientation layer 2 on the surface of which ruggedness of substantially a triangular shape is repeated in a manner repeating the ruggedness along a specified direction where two sides forming a convex portion of the triangular shape are different in length from each other (FIG. 8C).

A polarizing plate was combined with two glass substrates fabricated as described to make a liquid crystal element of TN (twisted nematic) type in a similar manner as the above Example 1. An excellent characteristic was obtained as was in Example 1.

It is seen from this that, in the liquid crystal element fabricated according to the present method, the liquid crystal molecules are sufficiently aligned and uniform and sufficient pretilt angle is obtained.

Its stability against heat and external forces presumably indicates the fact that the liquid crystal molecules are aligned in accordance with the principal chain that is the most stable portion of the molecules of the member which constitutes the orientation layer.

Figure 8D:
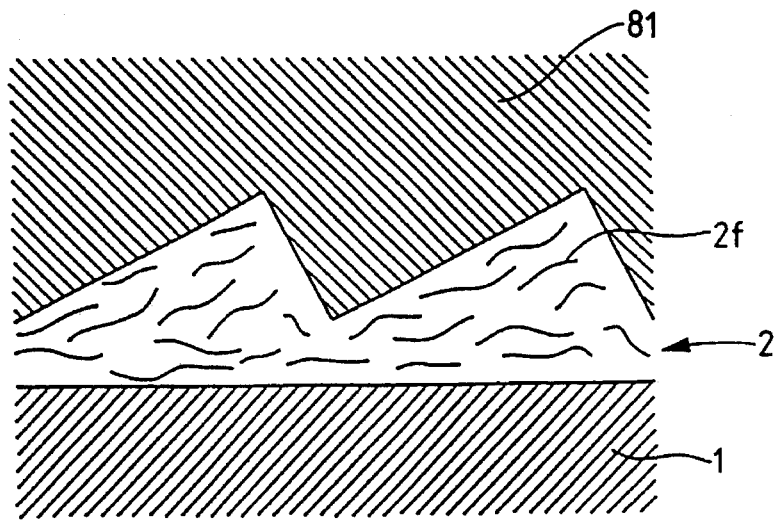

This is shown in FIG. 8D. Since the high-molecular liquid crystal constituting the orientation layer 2 is pressed against the mold 81 in the state where it is heated to a temperature 10 degrees or more higher than the melting point of the material thereof, the principal chain of the orientation layer molecules 2f are aligned in accordance with the surface configuration of the pressed mold.

Further, by peeling the pressed mold 81 from the orientation layer preparatory layer 2a at a temperature 20 degrees or more lower than the melting point, the surface configuration of the pressed mold is transferred onto the surface thereof. Thus, according to the present example, it is possible to securely produce an orientation layer for liquid crystals in which the principal chain of high-molecular liquid crystal molecules is aligned in a specified direction.

Example 10

The present example is described below by way of FIG. 7.

First, a photosensitive orientation layer preparatory layer 2a with the principal chain of the molecules constituting it being on the average aligned in a specified direction was formed by a method described in one of Examples 5, 7 and 8, on the surface of a rectangular glass substrate 1 having transparent electrodes (not shown) on the surface thereof.

Figure 7A:
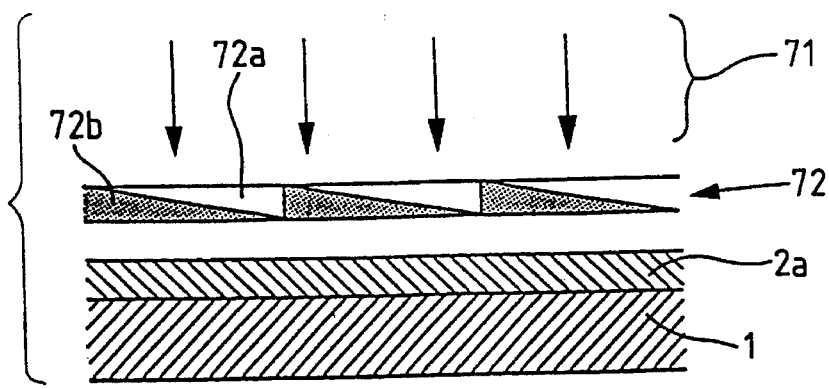
FIGS. 7A, 7B, 7C and 7D are schematic sectional views for explaining an example of the present invention.
Figure 7B:
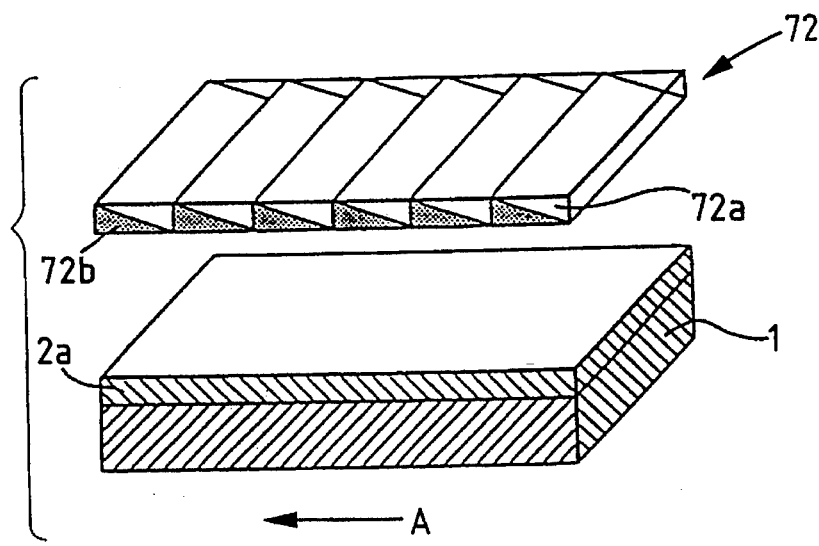
Figure 7C:
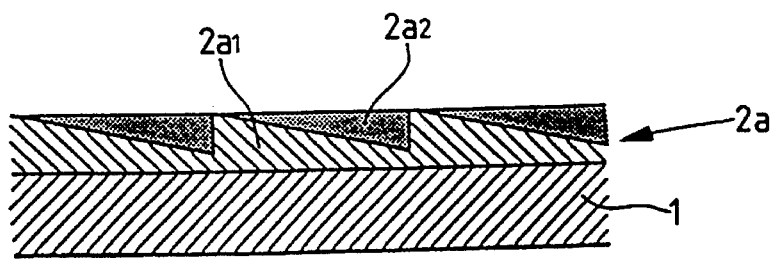

Parallel rays of light 71 were irradiated onto this surface through a mask 72 as shown in FIG. 7A as the second half of the process. The mask 72 used here is the one as shown in FIG. 7A in which a gradient transmitting portion 72a and a gradient light shielding portion 72b along which amount of transmitting light gradually changes are repeatedly formed in a direction perpendicular to the direction of A as shown in the figure which is the above specified direction (FIG. 7B).

A soluble orientation layer preparatory layer 2a2 sufficiently illuminated and a nonsoluble orientation layer preparatory layer 2a1 not sufficiently illuminated are repeated on the orientation layer preparatory layer 2a which has been subjected to such exposure.

Figure 7D:
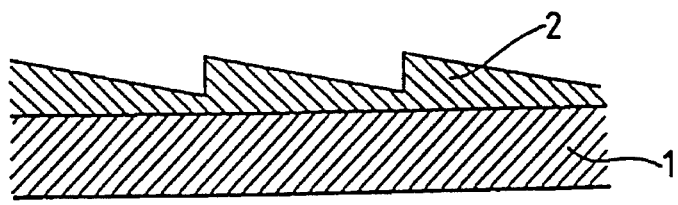

By developing the orientation layer preparatory layer 2a, a glass substrate 1 having an orientation layer preparatory layer on the surface thereof as shown in FIG. 7D is obtained, where substantially triangular ruggedness is repeated in a manner repeating the ruggedness along the above specified direction and two sides of the triangular shape forming a convex portion are different in length from each other.

Here, while the irradiation of the parallel rays of light has been rendered from the side of the orientation layer preparatory layer, it is also possible to effect the exposure from the side of the glass substrate.

By using the glass substrates obtained in this manner, a TN-type liquid crystal element was made in a similar manner as Example 1.

The TN type liquid crystal element fabricated as described was in a similar manner as the above Example 1 completely free of unevenness within the display screen both in its initial orientation and in the state where an AC of 2 V was applied across it and disclination did not occur. It is seen from this that uniform and sufficient pretilt angle is provided in the liquid crystal element which has been fabricated according to the present method.

Further, a value of 11 was obtained as a dichromic ratio for indicating the degree of orientation of the liquid crystal molecules. Sufficient orientation of the liquid crystal molecules was recognized.

According to the present example, too, a reliability similar to that of the above Example 1 was obtained.

Example 11

Figure 9A:
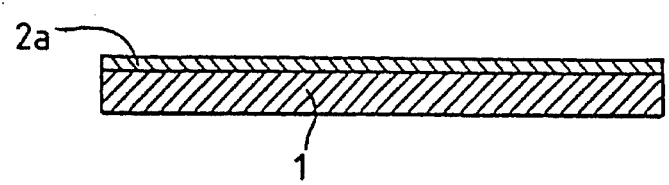
FIGS. 9A and 9B are schematic sectional views for explaining an example of the present invention.
Figure 9B:
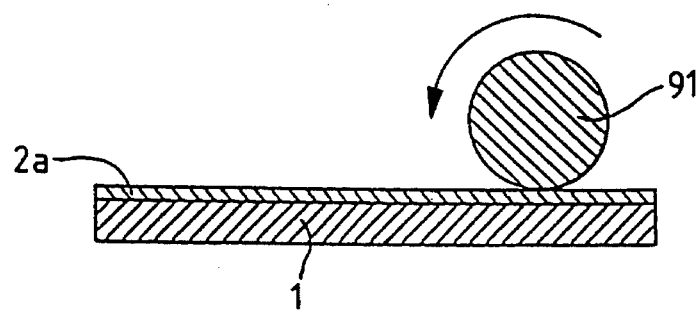

The present example is described below by way of FIG. 9.

As the first half of the process, a solution of 1,1,1,3,3,3-hexaphloro-2-propanol solution containing 5% of high-molecular liquid crystal (produced by Asahi Denka Kogyo) was applied on the surface of a triangular glass substrate 1 to form an orientation layer preparatory layer 2a. It was prebaked for 30 sec at 80° C. and was subjected to baking at 180° C. for one hour (FIG. 9A).

The orientation layer preparatory layer 2a was pressed in the direction of the length of the substrate by rolling a pressing roller 91 which was heated to 230° C. This pressing roller 91 was obtained by winding fluororubber (beinten produced by Sumitomo 3M Limited) 3 mm thick around the surface of a cylindrical core material made of a stainless steel having a diameter of 300 mm. The width of the pressing roller 91 is greater than the width of the substrate 1. Further, the tip speed of the pressing roller 91 was 1 mm/sec and its pressing force against the substrate 1 was 5 kg/cm$^2$.

Of the glass substrate 1 on the surface of which the orientation layer preparatory layer 2a has been formed in this manner, refractive index nA with respect to polarized light lengthwise thereof differs from refractive index nB with respect to polarized light perpendicular thereto in the direction of the width of the glass substrate. The refractive index nA is the maximum within the surface while the refractive index nB perpendicular thereto is the minimum within the surface, their difference $\Delta n$ being $2.86 \times 10^{-2}$.

Such anisotropy of refractive index indicates the fact that the principal chain of the molecules forming the orientation layer preparatory layer 2a which has been formed on the surface of the glass substrate 1 is aligned along the direction of the length of the glass substrate 1.

Next, in a similar manner as the second half of the process of Example 1, a mold 13 was pressed against the surface of the orientation layer preparatory layer 2a as the second half process to repeatedly form substantially triangular ruggedness on the surface.

In other words, the glass substrate 1 was obtained in a similar manner as Example 1, in which the principal chain of molecules of the member constituting the orientation layer 2 formed on the surface thereof is aligned along the length of the glass substrate 1 and, on the surface of the orientation layer 2, convex shape of substantially a triangular shape which has left and right sides that are not symmetrical to each other is repeated in a large number along the length of the glass substrate 1.

Two glass substrates fabricated as described were used to make a TN type liquid crystal element in a similar manner as Example 1. At this time, the orientation layers were combined so that they face each other and the longitudinal directions of the respective glass substrates are perpendicular to each other, and they are disposed to have a separation of 5 μm between them.

The TN type liquid crystal element fabricated as described was completely free of unevenness within the display screen both in its initial orientation and in the state where an AC of 2 V was applied across it and disclination did not occur. It is seen from this that uniform and sufficient pretilt angle is provided in the liquid crystal element which uses an orientation layer fabricated according to the present method.

Further, in order to find out the degree of the orientation of the liquid crystal molecules, 1% by weight of a dichroic dye (LSB-278 produced by Mitsubishi Kasei) was added to the nematic liquid crystal and a dichromic ratio of the liquid crystal was measured, which was the ratio of transmittance with respect to a polarized light of the lengthwise direction and the widthwise direction of one of the substrates. A dichromic ratio of 10 as that of the liquid crystal was obtained and the fact that the liquid crystal molecules were sufficiently aligned was recognized. Furthermore, reliability similar to that of the above Example 1 was also obtained by the present example.

In the present example, while the diameter of the pressing roller 91 was set to 300 mm, it is not necessarily limited to this value and 10 to 600 mm is preferable as such diameter. If the diameter is less than 10 mm, a sufficient rigidity is not obtained so that the pressing roller 91 is deformed and at the same time wrinkling occurs on the surface of the orientation layer preparatory layer 2a. Further, if the diameter is greater than 600 mm, the effect for stretching the orientation layer preparatory layer 2a into the direction of the length of the substrate 1 is lessened.

Further, the core material, naturally, is not limited to a stainless steel. Further, though, naturally, the surface material of the pressing roller 91 is not limited to fluororubber, it must be able to resist a temperature of 300° C. or higher. The tip speed of the pressing roller 91 is preferably 0.1 mm/sec to 20 mm/sec and the pressing force against the substrate 1 is preferably 0.5 kg/cm$^2$ to 50 kg/cm$^2$.

Example 12

The present embodiment differs from the above Example 11 in the material of the orientation layer and in the method of forming ruggedness on the surface thereof which is the second half of the process.

The photosensitive material used in Example 5 was used as the material of the orientation layer and it was rolled in a similar manner as Example 11 in the direction of the length of the substrate 1 by means of rolling of the pressing roller 91.

Of the glass substrate 1 on the surface of which the orientation layer preparatory layer 2a has been formed in this manner, refractive index nA with respect to polarized light lengthwise thereof differs from refractive index nB with respect to polarized light perpendicular thereto in the direction of the width of the glass substrate. The refractive index nA is the maximum within the surface while the refractive index nB perpendicular thereto is the minimum within the surface, their difference $\Delta n$ being $2.57 \times 10^{-2}$.

Such anisotropy of the refractive index indicates the fact that the principal chain of the molecules forming the orientation layer preparatory layer 2a which has been formed on the surface of the glass substrate 1 is aligned along the direction of the length of the glass substrate 1.

Next, the orientation layer material was subjected to two-ray interference exposure and was developed in a similar manner as Example 5 as the second half of the process. As a result, substantially triangular convex of which left and right sides are not symmetrical to each other is repeated in a large number on the surface of the photosensitive material, substantially along the traveling direction of the printing squeegee 4.

By using the glass substrates obtained in this manner, a TN type liquid crystal element was made in a similar manner as Example 1.

The TN type liquid crystal element fabricated as described was completely free of unevenness within the display screen both in its initial orientation and in the state where an AC of 2 V was applied across it and disclination did not occur.

It is seen from this that uniform and sufficient pretilt angle is provided in the liquid crystal element which was fabricated according to the present method.

Example 13

The present example differs from the above Example 12 in the method of forming the surface ruggedness which constitutes the second half of the process.

The photosensitive material used in Example 5 was used as the material of the orientation layer and it was rolled in a similar manner as Example 11 in the direction of the length of the substrate 1 by means of rolling of the pressing roller 91 which was heated to 180° C.

Exposure/developing processing was effected onto this surface in a similar manner as the second half process of Example 10, by using a mask having a gradient light transmitting portion and a gradient light shielding portion along which transmitting amount of light gradually changes.

By using the glass substrates obtained in this manner, a TN-type liquid crystal element was made in a similar manner as Example 1.

The TN type liquid crystal element fabricated as described was in a similar manner as the above Example 1 completely free of unevenness within the display screen both in its initial orientation and in the state where an AC of 2 V was applied across it and disclination did not occur. It is seen from this that uniform and sufficient pretilt angle is provided in the liquid crystal element which has been fabricated according to the present method.

Further, a value of 10.3 was obtained as a dichromic ratio for indicating the degree of orientation of the liquid crystal molecules. Sufficient orientation of the liquid crystal molecules was recognized.

According to the present example, too, a reliability similar to that of the above Example 1 was obtained.

Example 14

Figure 11:
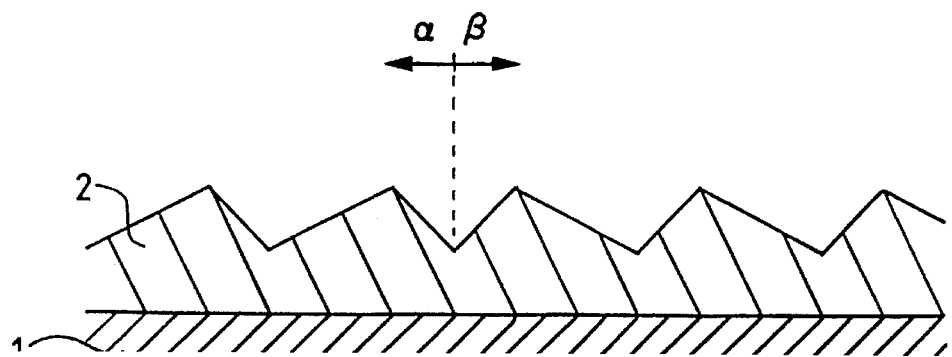
FIG. 11 is a schematic sectional view for explaining an example of the present invention.
Figure 12:
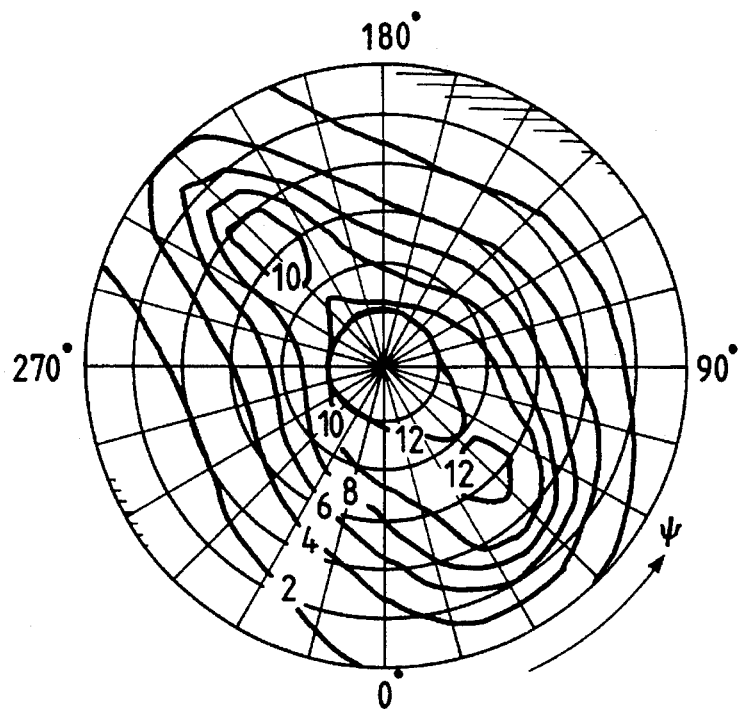
FIG. 12 shows distribution of equicontrast values of viewing angle according to an example of the present invention.
Figure 13:
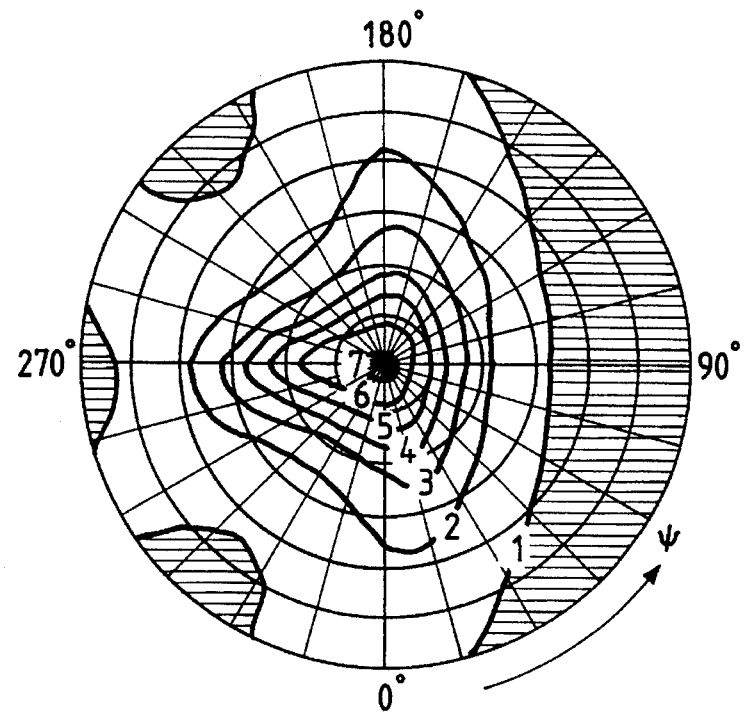
FIG. 13 shows distribution of equicontrast values of viewing angle according to a conventional art.

The present example differs from the above Example 1 in configuration of surface ruggedness in the direction along which substantially triangular projections are arranged that is the same direction as the traveling direction of the printing squeegee 11. A schematic cross sectional view of the state of the ruggedness along which the substantially triangular projections are arranged in the present example is shown in FIG. 11. In the present embodiment, as shown in FIG. 11, the disposition of the longer sides of the substantially triangular shapes is reversed between $\alpha$ direction and $\beta$ direction in the figure. Portions that are different in the arrangement of the substantially triangular shapes in this manner are disposed within a unit pixel of the liquid crystal element. In this manner, liquid crystal molecules are regularly aligned in the $\alpha$ direction and in the $\beta$ direction so as to widen the viewing angle for which a high contrast may be obtained with respect to each unit pixel. Here, a contrast is represented by the ratio of percent transmission at the time of applying an electric field across the liquid crystal element to percent transmission at the time of not applying the electric field across the same liquid crystal element. Distribution of equicontrast values by viewing angles according to the present invention is shown in FIG. 12. On the other hand, distribution of equicontrast values by viewing angles of the liquid crystal to which orientating processing was effected by means of a conventional rubbing method is shown in FIG. 13. In both FIGS. 13 and 14 numerals along the circumference of the concentric circles represents the azimuth of viewing and each concentric circle represent an inclination of 10° from a normal line with respect to the liquid crystal element surface. That is, the outermost circle represents an inclination of 60° from the direction of a normal line with respect to the liquid crystal element surface. It is confirmed from FIGS. 12 and 13 the present examples provides a larger area with high contrast than the conventional example. A liquid crystal element has conventionally been regarded as having relatively narrower viewing angle for which a high contrast may be obtained. According to the present example, however, a high contrast may be obtained in a remarkably wider area than the conventional example so that a liquid crystal element of higher quality may be achieved.

As has been described, according to the first or second aspect of the present invention, the principal chain of molecules of the member constituting an orientation layer is on the average aligned in a specified direction and, on the surface of the orientation layer, substantially triangular ruggedness is repeated so as to repeat the ruggedness in the above specified direction. Of the above triangular shape, two sides forming a convex portion are different in length from each other. In a liquid crystal element using this orientation layer, therefore, a sufficient pretilt angle may be obtained. There is thus an advantage that a liquid crystal element having an excellent characteristic may be obtained, where unevenness does not occur within the surface of the display screen and disclination is difficult to occur.

Also, since convex shape is formed in a repeated manner, the obtained pretilt angle does not have unevenness in its distribution within the surface so that unevenness in the display screen does not occur.

Further, since the boundary surface regulating force with respect to the liquid crystal is mainly resulted from the orientation of the main chain of the molecules of the member constituting the orientation layer, it is possible to obtain a liquid crystal element which is excellent in reliability against external forces and heat.

According to the third and fourth aspects of the present invention, it is possible to securely produce in a stable and efficient manner an orientation layer for liquid crystal as described in the first or second aspect of the present invention.

According to the second aspect of the present invention, high contrast may be obtained in a remarkably wider area comparing to the conventional example whereby a high quality liquid crystal element may be obtained.

What is claimed is:

1. An orientation layer for liquid crystal element, the orientation layer comprising:

a macromolecular material deposited on a substrate, the macromolecular material composed of main molecular chains on the average being aligned in a specified direction, a plurality of parallel microgrooves repeatedly formed on a surface of said macromolecular material, the microgrooves being aligned in a second direction, the second direction being perpendicular to said specified direction, each pair of adjacent microgrooves being separated by first and second sides forming a triangular ridge, the first and second sides being different in length from each other.

2. An orientation layer according to claim 1, wherein two sides of adjacent ridges have the same length, the two sides meeting at a common microgroove.

\* \* \* \* \*